April 24, 1928.  N. KADEL  1,667,008
UNDERGROUND ANTENNA
Filed Dec. 27, 1926
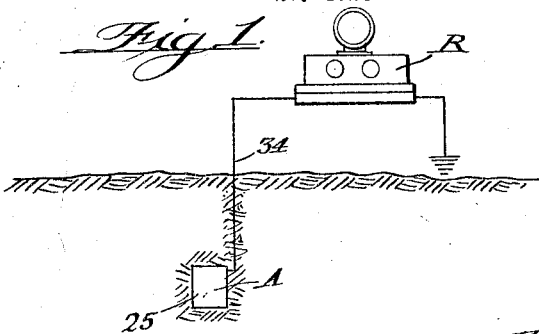
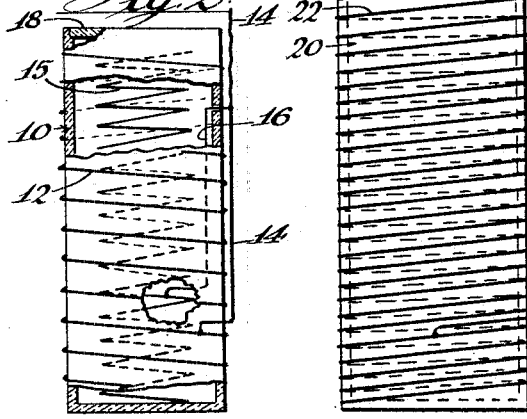
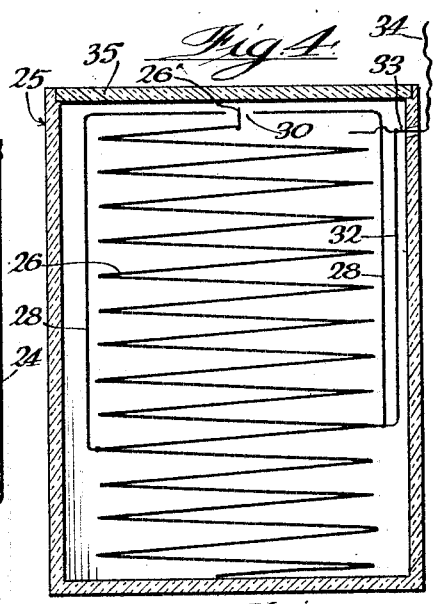
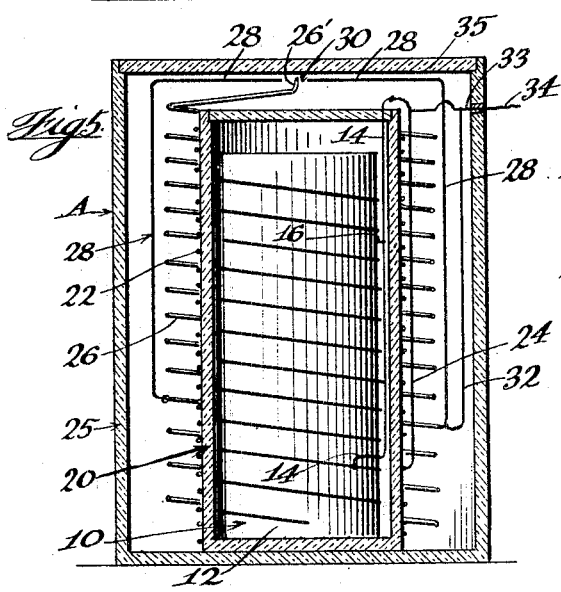
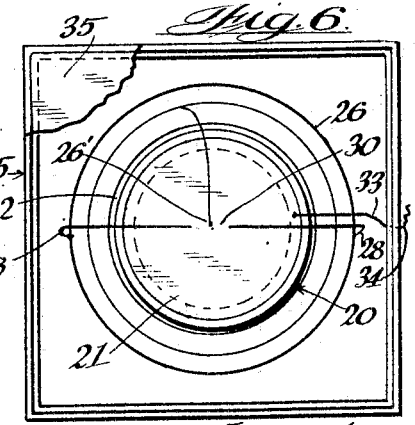
Inventor
Nicholas Kadel
by Edmund A. Strause
Attorney Patented Apr. 24, 1928.

1,667,008

UNITED STATES PATENT OFFICE.

NICHOLAS KADEL, OF GLENDALE, CALIFORNIA.

UNDERGROUND ANTENNA.

Application filed December 27, 1926. Serial No. 157,061.

This invention relates to devices for radio reception and more particularly to receiving aerials of the so-called underground type.

The primary object of the invention is to provide an aerial capable of eliminating all static and other disturbances which are commonly suffered wherever radio reception is undertaken in the vicinity of high tension power lines, street railways, motors in operation, and the like.

Briefly stated, the invention resides in a plurality of concentrically disposed helical coils of aerial wire connected in parallel and placed in an insulating container preferably in the form of a glass vessel. In the preferred form, the coils themselves are for the most part separated by glass and the coils are of bare wire. The leads from each coil may be taken off from intermediate convolutions and are so shown, although connections could be used. The outermost coil also preferably is provided with a pair of spaced arms which lead from intermediate points and are then brought toward each other at one end of the apparatus to form a narrow gap into which an extremity of the coil projects. This feature appears to have considerable value in neutralizing and eliminating undesirable and stray impulses.

The invention resides further in various other novel features of construction and arrangement which may be herein presented.

In the accompanying drawings wherein one embodiment of the invention is shown by way of example—

Fig. 1 indicates the arrangement of the device of the present invention in operative relation to a radio receiving set.

Fig. 2 is an elevational detail having portions broken away and showing only the innermost glass member with an inner and an outer coil with which it is associated.

Fig. 3 shows chiefly in elevation the intermediate glass member which receives the member of Fig. 2 and upon which a coil is wound.

Fig. 4 is a vertical section showing the outermost glass member and a coil which it is adapted to contain, this member being adapted to receive within its coil the member of Fig. 3.

Fig. 5 is a vertical section showing the various glass members and their coils in operative position, and Fig. 6 is a plan view of Fig. 5 but with the cover largely broken away.

The present device which is indicated in its entirety at —A— in Figs. 1 and 5, is adapted to be buried in the ground and to be connected with a radio receiving set —R— by means of a lead-in as in the case of any other type of aerial. The device is shown as comprising three glass containers 10, 20 and 25 shown respectively in Figs. 2, 3 and 4, each being in the form of a jar adapted to be sealed with the aid of a glass lid. The jar 10 has a coil 12 wound thereon, from an intermediate convolution of which a lead wire 14 extends, while within the jar a coil 15 is provided which has a lead wire 16 extending from an intermediate coil thereof and passing through and sealed in an opening in the jar, this lead 16 joining the lead 14. The jar 10 has a glass lid 18 sealed thereon, thus completely sealing this container.

Similarly, the intermediate jar 20, in which the jar 10 is placed, has a lid 21 sealed thereon, while a coil 22 is wound therearound and is provided with a lead 24 which extends to the top of the jar and is joined by the lead 14 which passes through and is sealed in an opening in the lid 21. The jar 20 is carried within the outer jar 25, a coil 26 being disposed within the outer jar but in spaced relation to the coil 22. It is preferred to form all of the coils of bare wire which is employed in such sizes and numbers of turns as may be desired. For example, from ten to fifteen convolutions may be employed for coils 12, 15 and 26 as indicated while more may be employed for coil 22 if desired. Wire of 6 gauge may be employed for coil 26, 12 gauge for coil 22, and finer gauges for coils 12 and 15, these details however being readily ascertainable by those skilled in the art.

A feature of appreciable value in eliminating various electrical interferences and disturbances resides in providing one of the coils, preferably the outer coil 26, with a pair of upstanding arms 28 which extend from opposite sides of an intermediate convolution to the space above the top of the respective jar and then approach each other to provide a narrow air gap 30 into which the adjacent extremity of the respective coil (26' as shown) may project. From an intermediate convolution of coil 26, a lead 32 extends and this joins a common lead 33 with which the leads 14 and 24 also are joined, thus connecting the various coils in parallel. The common lead 33 is passed through and sealed in an opening 34 in the outer jar 25, and serves as a means of connection with a receiving outfit. Sealing of the lid 35 upon the jar 25 completes the apparatus and renders it fit for placing in the ground.

With this device, results beyond expectations have been obtained. For example, on a two-tube dry-cell set many remote stations ranging as far away as Honolulu have been heard in Los Angeles without fading of the signals and without static or other electrical interferences, and this in the neighborhood of large power lines, electric railways and an electric sub-station.

No attempt is here made to establish a satisfactory theory, although it is quite obvious that undesired, stray and irregular impulses of whatever form of electrical influences are filtered out or neutralized, and that a uniform flow of positive electric energy is allowed to pass to the receiving instrument.

What I claim is:

1. In an underground aerial for radio reception, a plurality of glass containers arranged one within another, the outermost being sealed, a bare wire coil arranged in each of said containers, and a lead connecting said coils in parallel and passing without said outermost container.

2. In an underground aerial for radio reception, an inner glass member, a coil therewithin, a coil wrapped therearound, an intermediate glass member containing the inner member and having a coil wrapped therearound, an outer glass member receiving said intermediate member in spaced relation, a coil within the outer member and spaced outward from the intermediate member, and a lead connecting said coils in parallel and extending without the outer member.

3. In an underground aerial for radio reception, a plurailty of glass members arranged one within another, a coil within each of said members, and an additional coil within one of said members, arms connected with opposite sides of said additional coil and extending to one end of the coil and then directed toward each other to form a narrow gap, and a lead connecting said coils in parallel and extending from the device.

4. In an underground aerial for radio reception, a plurality of glass members arranged one within another, a coil within each of said members, and an additional coil within one of said members, arms connected with opposite sides of said additional coil and extending to one end of the coil and then directed toward each other to form a narrow gap, and a lead connecting said coils in parallel and extending from the device, one end of one of the coils extending into said gap and spaced from the extremities of said arms.

5. In an underground aerial for radio reception, a plurality of containers formed from an electrical insulating material arranged one within another, the outermost being sealed, a bare wire coil arranged in each of said containers, and a lead connecting said coils in parallel and passing without said outermost container.

In witness that I claim the foregoing I have hereunto subscribed my name this 29th day of November, 1926.

NICHOLAS KADEL.